US008878513B2

(12) United States Patent
Wong

(10) Patent No.: US 8,878,513 B2
(45) **Date of Patent: *Nov. 4, 2014**

(54) REGULATOR PROVIDING MULTIPLE OUTPUT VOLTAGES WITH DIFFERENT VOLTAGE LEVELS

(75) Inventor: KianTiong Wong, Johor (MY)

(73) Assignee: Mediatek Singapore Pte. Ltd., Singapore (SG)

( * ) Notice: Subject to any disclaimer, the term of this patent is extended or adjusted under 35 U.S.C. 154(b) by 691 days.

This patent is subject to a terminal disclaimer.

(21) Appl. No.: 13/196,608

(22) Filed: Aug. 2, 2011

(65) Prior Publication Data

US 2012/0205978 A1 Aug. 16, 2012

Related U.S. Application Data

(60) Provisional application No. 61/443,567, filed on Feb. 16, 2011.

(51) Int. Cl.
*H02M 3/155* (2006.01)
*G05F 1/56* (2006.01)

(52) U.S. Cl.
CPC .................................... *G05F 1/56* (2013.01)
USPC ............................ 323/349; 323/267; 323/315

(58) Field of Classification Search
USPC ................................. 323/267, 314, 315, 349
See application file for complete search history.

(56) References Cited

U.S. PATENT DOCUMENTS 6,321,772 B1 11/2001 Uehara et al.
6,771,052 B2 * 8/2004 Ostojic ......................... 323/266
7,719,345 B2 5/2010 Cho et al.
8,026,702 B2 * 9/2011 Tanzawa ....................... 323/267
8,217,635 B2 * 7/2012 Nonis et al. ................... 323/273
8,456,235 B2 * 6/2013 Tachibana et al. ............ 330/253
8,493,040 B2 * 7/2013 Gunther et al. ............... 323/267
8,648,580 B2 * 2/2014 Wong ............................ 323/265
2009/0195302 A1 8/2009 Lin et al.

(Continued)

FOREIGN PATENT DOCUMENTS

| | | |
|---|---|---|
| CN | 1267800 | 8/2006 |
| CN | 101242141 | 8/2008 |
| CN | 100492244 | 5/2009 |
| EP | 0 694 826 | 1/1996 |
| EP | 2 031 476 | 3/2009 |

OTHER PUBLICATIONS

English language translation of abstract of CN 1267800 (published Aug. 2, 2006).

(Continued)

*Primary Examiner* — Jeffrey Sterrett
(74) *Attorney, Agent, or Firm* — McClure, Qualey & Rodack, LLP

(57) ABSTRACT

A regulator for providing a plurality of output voltages is provided. The regulator includes a basic unit and a plurality of replica units. The basic unit amplifies an input voltage to obtain a core voltage according to a first control signal. Each of the replica units outputs one of the output voltages according to the input voltage and one of a plurality of second control signals, wherein at least two of the output voltages have different voltage levels. The first control signal is set according to the second control signals, to make the voltage level of the core voltage substantially equal to or less than a maximum voltage level of the output voltages and substantially equal to or greater than a minimum voltage level of the output voltages.

29 Claims, 8 Drawing Sheets

(56) References Cited

U.S. PATENT DOCUMENTS

| | | | | |
|---|---|---|---|---|
| 2009/0315531 | A1 | 12/2009 | Liao et al. | |
| 2010/0156362 | A1 | 6/2010 | Xle | |
| 2012/0013314 | A1 * | 1/2012 | Tanzawa | 323/267 |
| 2012/0205978 | A1 * | 8/2012 | Wong | 307/31 |
| 2013/0082668 | A1 * | 4/2013 | Tseng et al. | 323/267 |
| 2013/0154507 | A1 * | 6/2013 | Gilliom | 315/297 |

OTHER PUBLICATIONS

English language translation of abstract of CN 101242141 (published Aug. 13, 2008).
English language translation of abstract of CN 100492244 (published May 27, 2009).

* cited by examiner

| | Control Signal [3:1] | Voltage Level |
|---|---|---|
| | 111 | 1.60V |
| Maximum Output Voltage → | 110 | 1.55V |
| | 101 | 1.50V |
| Core Voltage → | 100 | 1.45V |
| | 011 | 1.40V |
| Minimum Output Voltage → | 010 | 1.35V |
| | 001 | 1.30V |
| | 000 | 1.25V |

FIG. 2B

| | Control Signal [3:1] | Voltage Level |
|---|---|---|
| | 111 | 1.60V |
| Maximum Output Voltage → | 110 | 1.55V |
| | 101 | 1.50V |
| Core Voltage → | 100 | 1.45V |
| | 011 | 1.40V |
| | 010 | 1.35V |
| Minimum Output Voltage → | 001 | 1.30V |
| | 000 | 1.25V |

FIG. 3B

REGULATOR PROVIDING MULTIPLE OUTPUT VOLTAGES WITH DIFFERENT VOLTAGE LEVELS

CROSS REFERENCE TO RELATED APPLICATIONS

This application claims priority of U.S. Provisional Application No. 61/443,567, filed on Feb. 16, 2011, the entirety of which is incorporated by reference herein.

BACKGROUND OF THE INVENTION

1. Field of the Invention

The present invention is related to a regulator for providing multiple output voltages, and more particularly to a regulator for providing various output voltages.

2. Description of the Related Art

Voltage regulators are used in a variety of systems to provide regulated voltages to circuits in the system. Generally, it is desirable to provide stable regulated voltages under a wide variety of loads, and operating frequencies, etc. In other words, a voltage regulator is designed to provide and maintain a constant voltage in electrical devices, such as a low dropout (LDO) voltage regulator, which is a DC linear voltage regulator which has a very small input-output differential voltage and relatively low output noise.

A measure of the effectiveness of a voltage regulator is its power supply rejection ratio (PSRR), which measures the amount of noise present on the power supply to the voltage regulator which is transmitted to an output voltage of the voltage regulator. A high PSRR is indicative of a low amount of noise transmission, and a low PSRR is indicative of a high amount of noise transmission. A high PSRR, particularly across a wide range of operating frequencies of devices being supplied by a voltage regulator, is difficult to achieve.

For example, assume that a crystal oscillator (XO) and a digitally controlled oscillator (DCO) of an all digital phase locked loop (ADPLL) are supplied by one LDO regulator. If the clock signal generated by the XO kicks back to its supply voltage, the clock signal may kick back again to the LDO regulator's supply voltage. If a high frequency PSRR is not high enough at the frequency offset or frequency range, the kick back noise may affect the supply voltage of the DCO. To prevent the de-sensing or interference problem, high PSRR performance is very important.

BRIEF SUMMARY OF THE INVENTION

Regulators for providing a plurality of output voltages are provided. An embodiment of a regulator for providing a plurality of output voltages is provided. The regulator comprises a basic unit and a plurality of replica units. The basic unit amplifies an input voltage to obtain a core voltage according to a first control signal. Each of the replica units outputs one of the output voltages according to the input voltage and one of a plurality of second control signals, wherein at least two of the output voltages have different voltage levels. The first control signal is set according to the second control signals, to make the voltage level of the core voltage substantially equal to or less than a maximum voltage level of the output voltages and substantially equal to or greater than a minimum voltage level of the output voltages.

Furthermore, another embodiment of a regulator for providing a plurality of output voltages is provided. The regulator comprises a core circuit and a plurality of replica units. The core circuit provides a bias voltage according to a first control signal and an input signal, and the core circuit comprises a basic unit. Each of the replica units outputs one of the output voltages, wherein at least two of the output voltages have different voltage levels. Each of the basic unit and the replica units comprises: a first transistor, having a gate for receiving the bias voltage, so that a reference current can flow through the first transistor; and a first resistor connected in cascade to the first transistor, having a resistance. A voltage level of the output voltage is determined according to the reference current and the resistance of the first resistor in each of the replica units.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 2B shows a table illustrating a relationship between the control signals and the voltage levels in FIG. 2A;

FIG. 3B shows a table illustrating a relationship between the control signals and the voltage levels in FIG. 3A;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
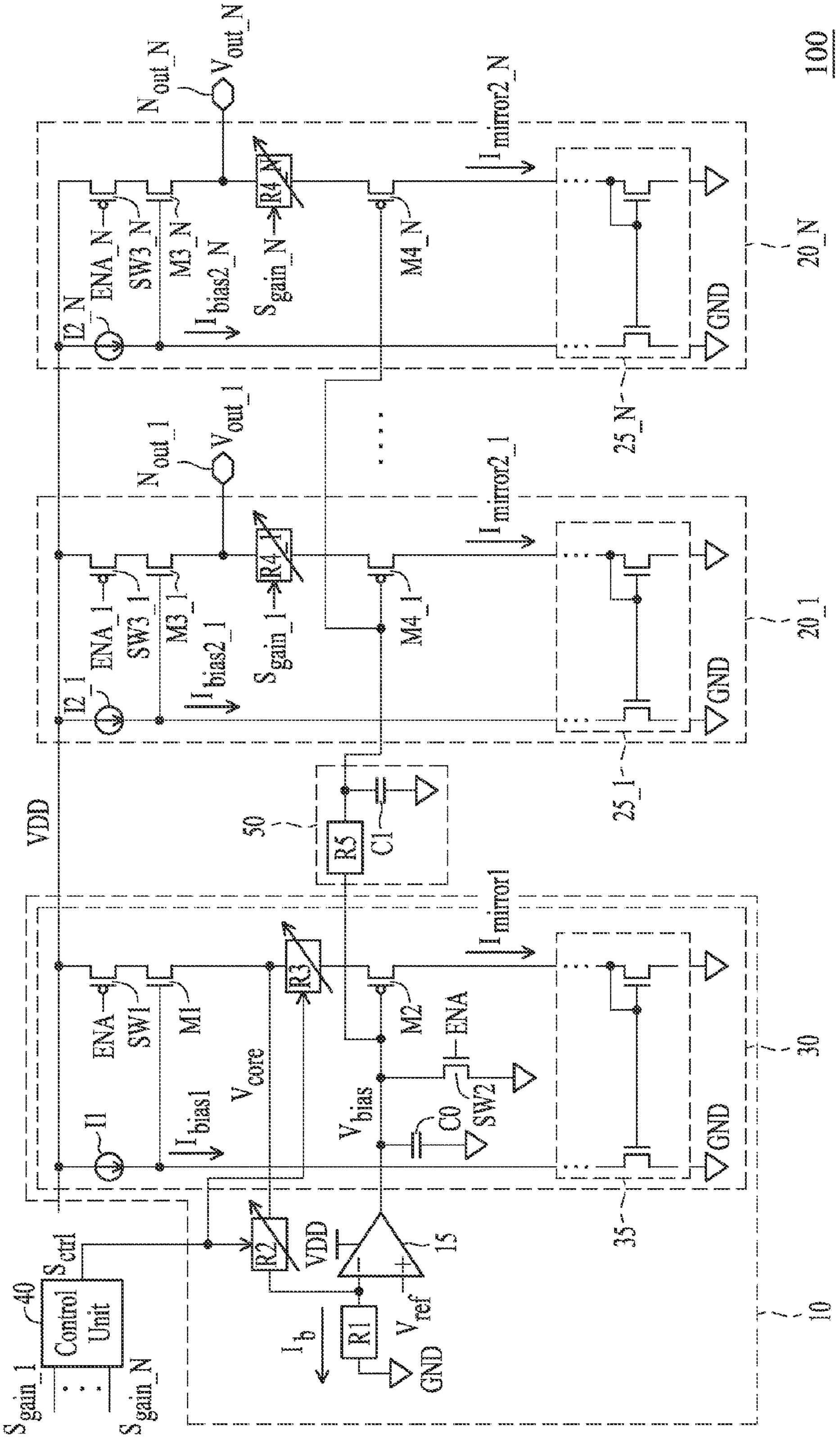
FIG. 1 shows a regulator according to an embodiment of the invention, wherein the regulator is a multi-output-level source follower typed replica capless LDO voltage regulator.

FIG. 1 shows a regulator 100 according to an embodiment of the invention. The regulator 100 is a multi-output-level source follower typed replica capless low dropout (LDO) voltage regulator, which provides the LDO voltages $V_{out\_1}$ to $V_{out\_N}$ in the output nodes $N_{out\_1}$ to $N_{out\_N}$, respectively. The regulator 100 comprises a core circuit 10, and N replica units 20_1 to 20_N. The core circuit 10 comprises an amplifier 15, two resistors R1 an R2 and a basic unit 30, wherein the resistor R2 is a variable resistor. The amplifier 15 has a non-inverting input terminal (+) receiving an input voltage $V_{ref}$, an inverting input terminal (−) coupled to the resistors R1 and R2, and an output terminal for simultaneously outputting a bias voltage $V_{bias}$ to the basic unit 30 and the replica units 20_1 to 20_N. The resistor R1 is coupled between a ground GND and the inverting input terminal of the amplifier 15, and the resistor R2 is coupled between the inverting input terminal of the amplifier 15 and a variable resistor R3 of the basic unit 30. In the core circuit 10, the resistances of the resistors R2 and R3 are controlled by a control signal $S_{ctrl}$ simultaneously. The basic unit 30 comprises a current source I1, two transistors M1 and M2, the resistor R3 and a current circuit 35. In the embodiment, the current circuit 35 is a current mirror, and since the current mirror is known in the art, it will not be described in detail herein. The current source I1 is coupled between a supply voltage VDD and a gate of the transistor M1, which provides a fixed bias current $I_{bias1}$ to the current mirror 35. The transistor M1 is coupled between the supply voltage VDD and the resistor R3, and the transistor M2 is coupled between the resistor R3 and the current mirror 35. The current mirror 35 is coupled to the current source I1, the transistor M2 and ground GND, which drains a mirror current $I_{mirror1}$ from the transistor M2 according to the bias current $I_{bias1}$. In FIG. 1, the bias voltage $V_{bias}$ can be given as the following equation:

$$\begin{aligned} V_{bias} &= V_{core} - I_{mirror1} \times R3 - |V_{gsM2}| \\ &= \frac{R1 + R2}{R1} V_{ref} - I_{mirror1} \times R3 - |V_{gsM2}| \\ &= (R1 + R2) I_b - I_{mirror1} \times R3 - |V_{gsM2}|, \end{aligned}$$

where $$I_b = \frac{V_{ref}}{R1}.$$

In one embodiment, the control signal $S_{ctrl}$ controls the resistors R2 and R3 to have the same resistances, thus a voltage across the resistor R2 is equal to a voltage across the resistor R3 when the currents flow through the resistors R2 and R3 are the same, i.e. $I_b = I_{mirror1}$. If the currents flow through the resistors R2 and R3 are different, the control signal $S_{ctrl}$ controls the resistance variations of the resistors R2 and R3 (e.g. ΔR2 and ΔR3) to conform to a specific proportion, so as to keep the bias voltage $V_{bias}$ as a constant voltage. It is to be noted that the transistors M1 and M2 are different type of MOS transistors. In the embodiment, the transistor M1 is an NMOS transistor and the transistor M2 is a PMOS transistor. In the embodiment, the transistor M1 is a native device. In other embodiments, the transistor M1 is an N-type transistor of I/O or core circuit.

In the core circuit 10, the basic unit 30 further comprises a switch SW1 coupled between the supply voltage VDD and the transistor M1 and a switch SW2 coupled between the ground GND and the output terminal of the amplifier 15, wherein the switches SW1 and SW2 are controlled, together, by a signal ENA. In the embodiment, the switch SW1 is a PMOS transistor and the switch SW2 is an NMOS transistor. Therefore, the switches SW1 and SW2 are not turned on at the same time. When the regulator 100 is powered down, the signal ENA controls the switch SW1 to turn off and the switch SW2 to turn on, thus, no current $I_{mirror1}$ is generated. On the contrary, the switch SW1 is turned on and the switch SW2 is turned off when the regulator 100 is powered on. In the regulator 100, the switch SW1 further provides electrostatic discharge (ESD) protection, and the switch SW2 and a capacitor C0 further provide a start-up function to prevent overshoot. Specifically, the switch SW2 is used to initialize the bias voltage $V_{bias}$ rising up from zero voltage when the regulator 100 starts up, to avoid overshoot in the LDO voltages $V_{out\_1}$ to $V_{out\_N}$.

In FIG. 1, the replica unit 20_1 comprises a current source I2_1, a switch SW3_1, two transistors M3_1 and M4_1, a resistor R4_1 and a current circuit 25_1, wherein the current circuit 25_1 is a current mirror. The current source I2_1 is coupled between the supply voltage VDD and a gate of the transistor M3_1, which provides a bias current $I_{bias2\_1}$ to the current mirror 25_1, wherein the bias current $I_{bias2\_1}$ matches the bias current $I_{bias1}$ of the basic unit 30. The switch SW3_1 is coupled between the supply voltage VDD and the transistor M3_1, and the switch SW3_1 is controlled by a signal ENA_1. The transistor M3_1 is coupled between the switch SW3_1 and an output node $N_{out\_1}$, and the resistor R4_1 is coupled between the output node $N_{out\_1}$ and the transistor M4_1, wherein the output node $N_{out\_1}$ is used to output an output voltage $V_{out\_1}$. The resistor R4_1 is a variable resistor controlled by a control signal $S_{gain\_1}$. The transistor M4_1 is coupled between the resistor R4_1 and the current mirror 25_1. The current mirror 25_1 is coupled to the current source I2_1, the transistor M4_1 and ground GND, which drains a mirror current $I_{mirror2\_1}$ from the transistor M4_1 according to the bias current $I_{bias2\_1}$. Similarly, the transistors M3_1 and M4_1 are different type of MOS transistors, wherein the size of the transistor M4_1 matches that of the transistor M2 of the basic unit 30. In the embodiment, the transistor M3_1 is an NMOS transistor and the transistor M4_1 is a PMOS transistor. In the embodiment, the transistor M3_1 is a native device. In other embodiments, the transistor M3_1 is an N-type transistor of I/O or core circuit. Substantially, the replica units 20_1 to 20_N have the same architecture, except that the switches SW3_1 to SW3_N are respectively controlled by the ENA_1 to ENA_N and resistances of the resistors R4_1 to R4_N are respectively controlled by the control signals $S_{gain\_1}$ to $S_{gain\_N}$. In the regulator 100, the signal ENA is obtained according to the signals ENA_1 to ENA_N, so that the switch SW1 is turned on when any one of the switches SW3_1 to SW3_N is turned on. Furthermore, the regulator 100 further comprises a low pass filter (LPF) 50 between the gate of the transistor M2 and the gates of the transistors M4_1 to M4_N, wherein the LPF 50 is used to filter out noise from the bias voltage $V_{bias}$. In the embodiment, the LPF 300 comprises a resistor R5 coupled between the gate of the transistor M2 and the gates of the transistors M4, and a capacitor C1 between the resistor R5 and the ground GND. It is to be noted that, in the embodiment, the gate voltages of the transistor M2 and the transistors M4_1 to M4_N and the bias voltage $V_{bias}$ are assumed to be equal. In the embodiment, the LPF 300 is an example and does not limit the invention. Furthermore, compared with conventional replica LDO regulators, only global matching is needed to be considered for the transistor M2 and the transistors M4_1 to M4_N and the current source I1 and the current sources I2_1 to I2_N in the regulator 100 for design and layout. For the current mirrors 25_1 to 25_N, only local matching needs to be considered, thereby decreasing design and layout complexity.

In the core circuit 10, the amplifier 15 and the basic unit 30 form a feedback loop. Firstly, assuming the current $I_{mirror1}$ initially flowing through the current mirror 35 is zero, then, the gate of the transistor M1 is pulled to high due to the fact that the bias current $I_{bias1}$ is applied. Thus, the current $I_{mirror1}$ flows from the supply voltage VDD to the ground GND through the transistor M1, the resistor R3, the transistor M2 and the current mirror 35, and then the gate of the transistor M1 is pulled back due to a closed loop being formed. The closed loop stabilizes when the current $I_{mirror1}$ is equal to the bias current $I_{bias1}$, thus the bias voltage $V_{bias}$ is stably provided to the gates of the transistors M2 and M4.

In the regulator 100, when the basic unit 30 and the replica units 20_1 to 20_N are at stable states, the gate-source voltages of the transistor M2 and the transistors M4_1 to M4_N are the same due to the fact that the sizes and currents (i.e. the current $I_{mirror1}$ and the currents $I_{mirror2\_1}$ to $I_{mirror2\_N}$) of the transistor M2 and the transistors M4_1 to M4_N are the same and the gates of the transistor M2 and the transistors M4_1 to M4_N are controlled by the same bias voltage $V_{bias}$. In one embodiment, by proportionating the sizes of the transistors M2 and M4_1 to M4_N and the currents of the transistors M2 and M4_1 to M4_N (i.e. the current sources I1 and I2_1 to I2_N), the gate-source voltages of the transistor M2 and the transistors M4_1 to M4_N are the same. Thus, the LDO voltages $V_{out\_1}$ to $V_{out\_N}$ are determined according to the bias voltage $V_{bias}$, the gate-source voltages of the transistors M4_1 to M4_N and the voltages across the resistors R4_1 to R4_N in the replica units 20_1 to 20_N, respectively. Take the replica unit 20_1 as an example. The output voltage $V_{out\_1}$ is equal to the sum of the bias voltage $V_{bias}$, the gate-source voltages of the transistor M4_1 and the voltage across the resistor R4_1 in the replica unit 20_1, as shown in the following equation:

$$
\begin{aligned}
V_{out\_1} &= V_{bias} + |V_{gsM4}| + I_{mirror2\_1} \times R4\_1 \\
&= V_{core} - I_{mirror1} \times R3 - |V_{gsM2}| + |V_{gsM4}| + I_{mirror2\_1} \times R4\_1 \\
&= V_{core} + I_{mirror}(R4\_1 - R3) \\
&= \frac{R1 + R2}{R_1} V_{ref} + I_{mirror}(R4\_1 - R3),
\end{aligned}
$$

where $I_{mirror}=I_{mirror2\_1}=I_{mirror1}$ and $V_{gsM2}=V_{gsM4}$. Specifically, the output voltages $V_{out\_1}$ to $V_{out\_N}$ are determined according to the various resistances of the resistors R4_1 to R4_N in the replica units 20_1 to 20_N due to the bias voltage $V_{bias}$, the gate-source voltages of the transistors M4_1 to M4_N and the currents $I_{mirror2\_1}$ to $I_{mirror2\_N}$ being the same, wherein each resistance of the resistors R4_1 to R4_N in the replica units 20_1 to 20_N is controlled by an individual control signal (e.g. $S_{gain\_1}$, . . . , or $S_{gain\_N}$). Therefore, by using the control signals $S_{gain\_1}$ to $S_{gain\_N}$ to adjust the resistances of the resistors R4_1 to R4_N, the regulator 100 can provide the output voltages $V_{out\_1}$ to $V_{out\_N}$ with various voltage levels in the output nodes $N_{out\_1}$ to $N_{out\_N}$, respectively. For the replica units 20_1 to 20_N, the sizes of the switches SW3_1 to SW3_N can be the same or different, which depend on the capability for IR drop. Furthermore, the sizes of the power transistors M3_1 to M3_N can be the same or different, which depend on supplied currents for the replica units 20_1 to 20_N. Moreover, the sizes of the devices within the replica units 20_1 to 20_N should be equal or proportional to the sizes of the devices within the basic unit 30, such that each of the currents $I_{mirror2\_1}$ to $I_{mirror2\_N}$ matches the current $I_{mirror1}$.

Figure 2A:
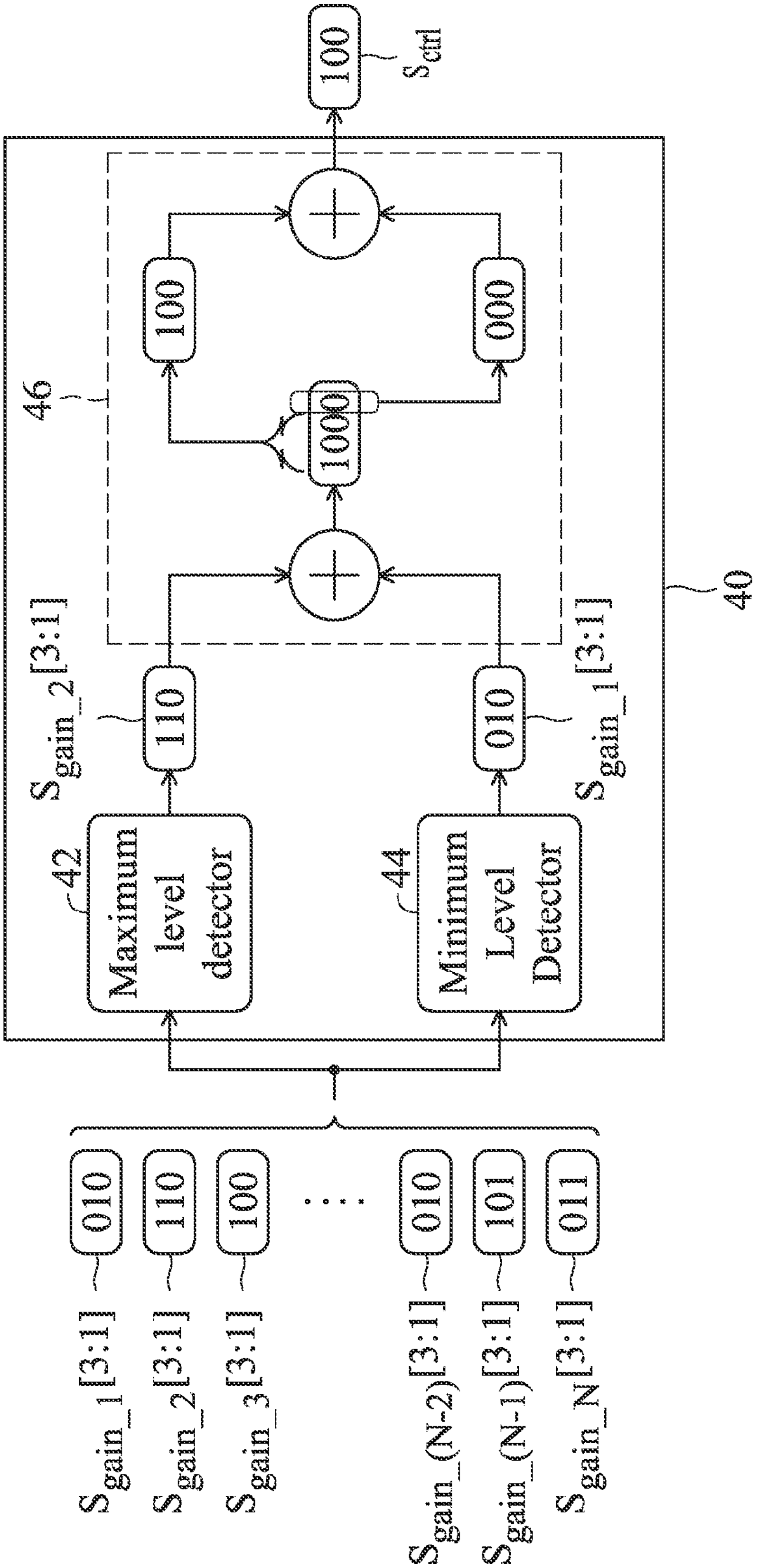
FIG. 2A shows an example illustrating an operation of the control unit of FIG. 1.

In FIG. 1, the bias voltage $V_{bias}$ is obtained according to a core voltage $V_{core}$, the gate-source voltage of the transistor M2 and the voltage across the resistor R3 in the basic unit 30, wherein the resistances of the resistors R2 and R3 are controlled by the control signal $S_{ctrl}$ from a control unit 40 that provides the control signal $S_{ctrl}$ according to the control signals $S_{gain\_1}$ to $S_{gain\_N}$ to optimize power supply rejection ratio (PSRR) performance for the output voltages $V_{out\_1}$ to $V_{out\_N}$. Referring to FIG. 2A and FIG. 2B together, FIG. 2A shows an example illustrating an operation of the control unit 40 of FIG. 1, and FIG. 2B shows a table illustrating a relationship between the control signals and the voltage levels of the core voltage $V_{core}$ in FIG. 2A. In FIG. 2A and FIG. 2B, each of the control signals $S_{gain\_1}$ to $S_{gain\_N}$ is a logic signal, which uses 3 bits to represent an integer value that indicates a gain level corresponding to a ratio of the individual resistor R4 to the resistor R3. The operations of the control unit 40 of FIGS. 2A and 2B are used as an example for description, and do not limit the invention. As shown in FIG. 2A, the control signal $S_{gain\_1}$ [3:1] is "010", the control signal $S_{gain\_2}$ [3:1] is "110", the control signal $S_{gain\_3}$ [3:1] is "100", the control signal $S_{gain\_(N-2)}$ [3:1] is "010", the control signal $S_{gain\_(N-1)}$ [3:1] is "101" and the control signal $S_{gain\_N}$ [3:1] is "011", wherein the voltage levels of the control signals $S_{gain\_1}$ to $S_{gain\_N}$ can be obtained by looking up the table of FIG. 2B. For example, "010" represents that the replica unit 20_1 can provide the output voltages $V_{out\_1}$ with the voltage level of 1.35V in the output node $N_{out\_1}$. After receiving the control signals $S_{gain\_1}$ to $S_{gain\_N}$, the control unit 40 uses a maximum level detector 42 and a minimum level detector 44 to find out a control signal having a maximum integer value and a control signal having a minimum integer value, respectively, and then use a calculator 46 to average the maximum integer value and the minimum integer value, so as to obtain the control signal $S_{ctrl}$ with the averaged integer value. As shown in FIG. 2A, the maximum level detector 42 determines that the control signal $S_{gain\_2}$ has the maximum integer value "110", and the minimum level detector 44 determines that the control signal $S_{gain\_1}$ or $S_{gain\_(N-2)}$ has the minimum integer value "010". Next, the calculator 46 sums up the maximum integer value "110" and the minimum integer value "010" to obtain a sum value "1000", wherein the sum value "1000" is an even binary value. Then, the calculator 46 divides the sum value "1000" by 2 (e.g. shift 1 bit to right) to obtain the control signal $S_{ctrl}$ with the averaged value "100". For example, two parts are separated from the sum value "1000", wherein one part is the more significant three bits "100" and another part is the least significant bit (LSB) "0". Next, the LSB "0" is extended to three bits "000" by adding "00". Next, the values "100" and "000" are summed to obtain the averaged value "100". Thus, the control unit 40 provides the control signal $S_{ctrl}$ with the averaged value "100" to control the resistances of the resistors R2 and R3, so as to obtain the core voltage $V_{core}$ with the voltage level of 1.45V. Therefore, the voltage level of the core voltage $V_{core}$ is equal to an average of the maximum and minimum output voltage levels. It is to be noted that the operation of the control unit 40 is an example and does not limit the invention, and the control unit can be implemented in hardware or software.

Figure 3A:
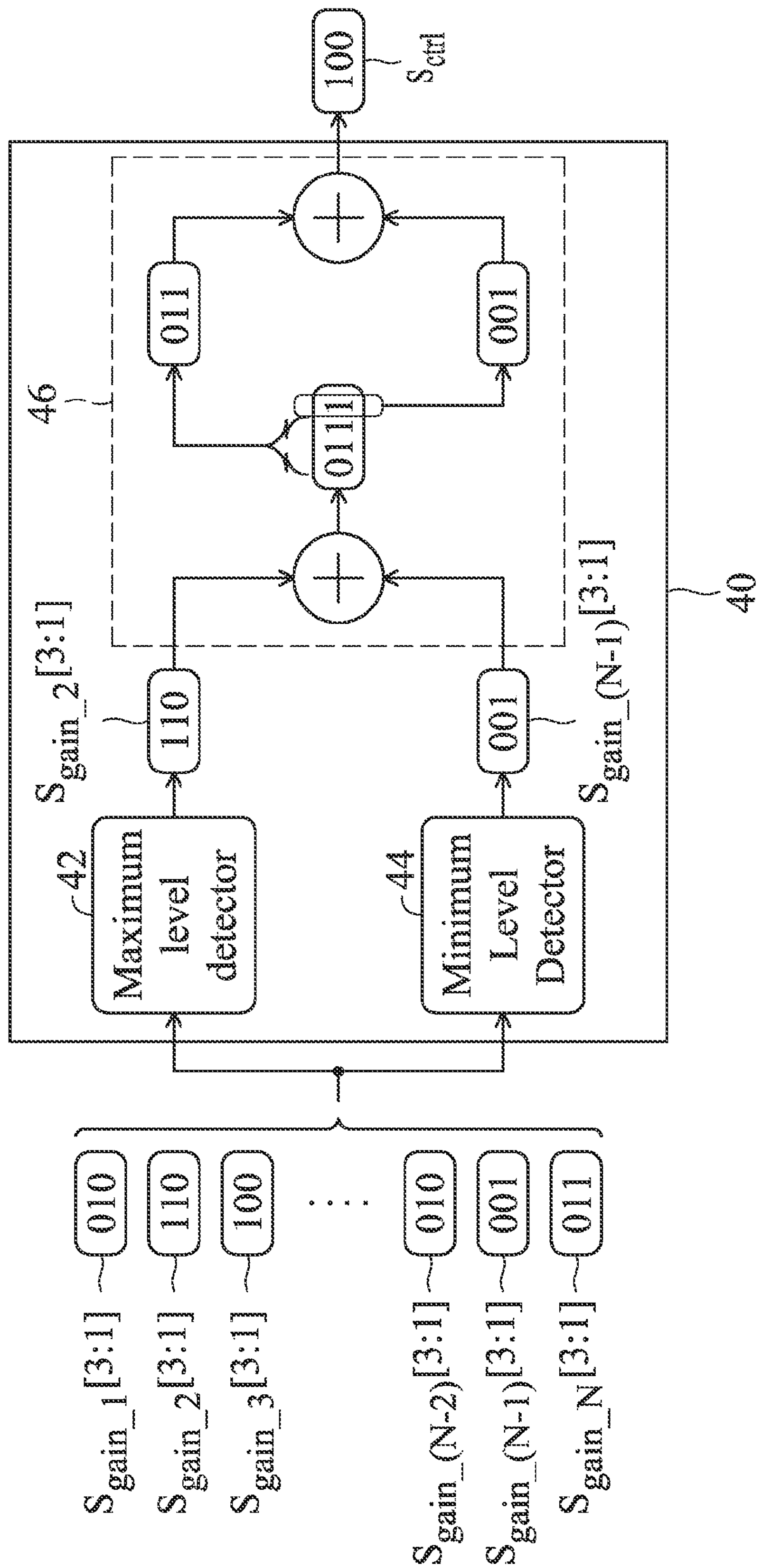
FIG. 3A shows another example illustrating an operation of the control unit of FIG. 1.

FIG. 3A shows another example illustrating an operation of the control unit 40 of FIG. 1 that a sum of the maximum integer value and the minimum integer value can not be divisible by 2, and FIG. 3B shows a table illustrating a relationship between the control signals and the voltage levels in FIG. 3A. In FIG. 3A, according to the control signals $S_{gain\_1}$ to $S_{gain\_N}$, the maximum level detector 42 determines that the control signal $S_{gain\_2}$ has the maximum integer value "110", and the minimum level detector 44 determines that the control signal $S_{gain\_(N-1)}$ has the minimum integer value "001". Next, the calculator 46 sums up the maximum integer value "110" and the minimum integer value "001" to obtain a sum value "0111", wherein the sum value "0111" is an odd binary value. Next, the calculator 46 divides the sum value "0111" by 2 and rounds the divided value to obtain an averaged integer value "100". For example, two parts are separated from the sum value "0111", wherein one part is the more significant three bits "011" and another part is the LSB "1". Next, the LSB "1" is extended to three bits "001" by adding "00". Next, the values "011" and "001" are summed to obtain the averaged value "100". Thus, the control unit 40 provides the control signal $S_{ctrl}$ with the averaged integer value "100" to control the resistances of the resistors R2 and R3, so as to obtain the core voltage $V_{core}$ with the voltage level of 1.45V. Therefore, the voltage level of the core voltage $V_{core}$ is equal to a rounding value of an average of the maximum and minimum output voltage levels.

As described above, the control unit 40 provides the control signal $S_{ctrl}$ with a specific value to control the resistances of the resistors R2 and R3, such that the core voltage $V_{core}$ is equal to or close to an average of the output voltage with the maximum voltage level and the output voltage with the minimum voltage level. Thus, a PSRR at a low frequency can be enhanced through the PSRR cancellation mechanism in the regulator 100. For example, noise from the supply voltage VDD can be divided into a plurality of paths P1, P2, P3, P4 and P5 in the regulator 100. In each of the replica units 20_1 to 20_N, the path P1 is from the supply voltage VDD to its output node through the corresponding switch SW3 and the transistor M3, and the path P2 is from the supply voltage VDD to its output node through the current source 12 and the transistor M3. Furthermore, the paths P3 are from the supply voltage VDD to the output nodes of the replica units 20_1 to 20_N through the switch SW1, the transistor M1, the resistor R2, the amplifier 15, LPF 50 and the transistors M4_1 to M4_N of the replica units 20_1 to 20_N. The path P4 is from the supply voltage VDD to the output nodes of the replica units 20_1 to 20_N through the current source I1, the transistor M1, the resistor R2, the amplifier 15, LPF 50 and the transistors M4_1 to M4_N of the replica units 20_1 to 20_N. The path P5 is from the supply voltage VDD to the output nodes of the replica units 20_1 to 20_N through the amplifier 15, LPF 50 and the transistors M4_1 to M4_N of the replica units 20_1 to 20_N. Due to the fact that the amplifier 15 is operated in a negative feedback loop, the noise through the paths P4 and P3 is reversed in the output nodes of the replica units 20_1 to 20_N. Thus, though the voltages in the output nodes of the replica units 20_1 to 20_N may be different, the noise through the paths P1 and P2 can be appropriately cancelled out in the output nodes of the replica units 20_1 to 20_N due to the resistance of the resistor R2 in the negative feedback loop of the amplifier 15 being controlled according to the maximum and minimum output voltages. Therefore, a PSRR at a low frequency is enhanced. Furthermore, since the transistors M3_1 to M3_N of the replica units 20_1 to 20_N are NMOSs, the PSRR of the regulator 100 is close to 1/(gm× ro) at a high frequency, where gm and ro are the transconductance and the output resistance of the each of the transistors M3_1 to M3_N. In addition, reversed isolation from the LDO voltage $V_{out}$ to the input voltage $V_{ref}$ is better than the conventional replica LDO regulators, so the non-inverting input terminal of the amplifier 15 can be directly connected to a very sensitive reference point (e.g. a bandgap voltage VBG).

According to the embodiments, the multi-output-level source follower typed replica capless LDO regulators can provide a high PSRR from several MHz to hundreds of MHz. Furthermore, through the cancellation mechanism, the regulators further improve low frequency PSRR. Therefore, the multi-output-level source follower typed replica capless LDO regulators can provide replicated output voltages to other circuits; especially level shifters, digital circuits, analog circuits, RF circuits and so on.

Figure 4:
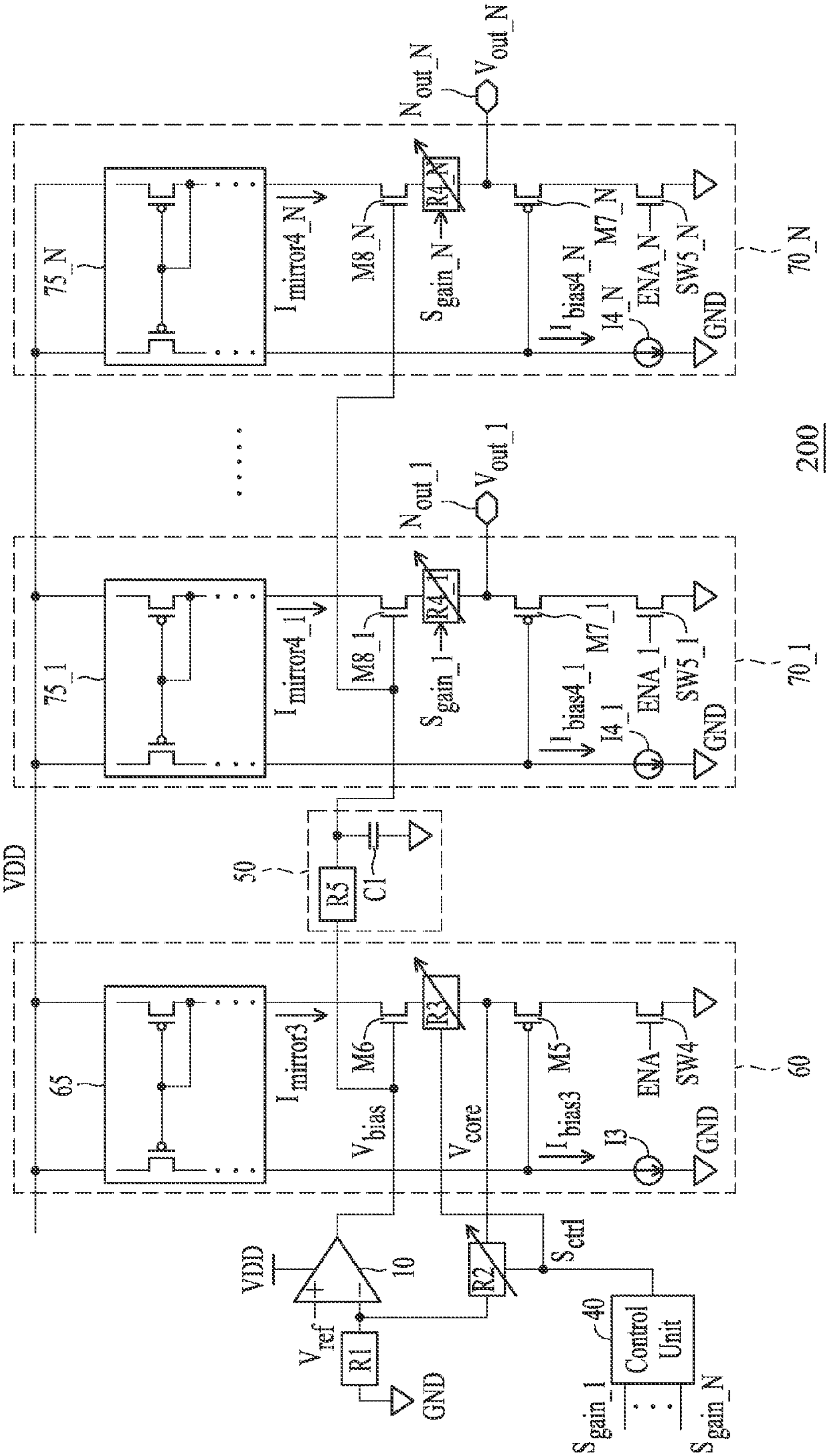
FIG. 4 shows a regulator according to another embodiment of the invention, wherein the regulator is a multi-output-level source follower typed replica capless LDO voltage regulator.

FIG. 4 shows a regulator 200 according to another embodiment of the invention, wherein the regulator 200 is a multi-output-level source follower typed replica capless LDO voltage regulator. The regulator 200 comprises a basic unit 60 and a plurality of replica units 70_1 to 70_N. The basic unit 60 comprises a current source 13, the transistors M5 and M6, a switch SW4, a variable resistor R3 controlled by the control signal $S_{ctrl}$ and a current mirror 65, wherein the current source 13 drains a bias current $I_{bias3}$ from the current mirror 65 and then the current mirror 65 provides a current $I_{mirror3}$ according to the bias current $I_{bias3}$. The replica units 70_1 to 70_N have the same circuits, each providing an individual LDO voltage at an individual output node. Take the replica unit 70_1 as an example. The replica unit 70_1 comprises a current source I4_1, the transistors M7_1 and M8_1, a switch SW5_1, a variable resistor R4_1 controlled by a control signal $S_{gain\_1}$ and a current mirror 75_1, wherein the current source I4_1 drains a bias current $I_{bias4\_1}$ from the current mirror 75_1 and the current mirror 75_1 provides a current $I_{mirror4\_1}$ according to the bias current $I_{bias4\_1}$. In the regulator 200, the transistor M5 and the transistors M7_1 to M7_N are PMOS transistors and the transistor M6 and the transistors M8_1 to M8_N are NMOS transistors. In the embodiment, the transistor M5 and the transistors M7_1 to M7_N are native devices. In other embodiments, the transistor M5 and the transistors M7_1 to M7_N are N-type transistors of I/O or core circuit. Similarly, the output voltages $V_{out\_1}$ to $V_{out\_N}$ in the output nodes $N_{out\_1}$ to $N_{out\_N}$ are determined according to the resistances of the resistors R4_1 to R4_N in the replica units 70_1 to 70_N due to the bias voltage $V_{bias}$, the gate-source voltages of the transistors M4_1 to M4_N and the currents $I_{mirror4\_1}$ to $I_{mirror4\_N}$ being the same, wherein each of the resistances of the resistors R4_1 to R4_N in the replica units 70_1 to 70_N is controlled by an individual control signal (e.g. $S_{gain\_1}$ to $S_{gain\_N}$). Therefore, by using the control signals $S_{gain\_1}$ to $S_{gain\_N}$ to adjust the resistances of the resistors R4_1 to R4_N, the regulator 200 can provide the output voltages $V_{out\_1}$ to $V_{out\_N}$ with various voltage levels in the output nodes $N_{out\_1}$ to $N_{out\_N}$. In addition, the control unit 40 provides the control signal $S_{ctrl}$ according to the control signals $S_{gain\_1}$ to $S_{gain\_N}$ to optimize PSRR performance for the output voltages $V_{out\_1}$ to $V_{out\_N}$. Moreover, the sizes of the devices within the replica units 70_1 to 70_N should be equal or proportional to the sizes of the devices within the basic unit 60, such that each of the currents $I_{mirror4\_1}$ to $I_{mirror4\_N}$ matches the current $I_{mirror3}$.

Figure 5:
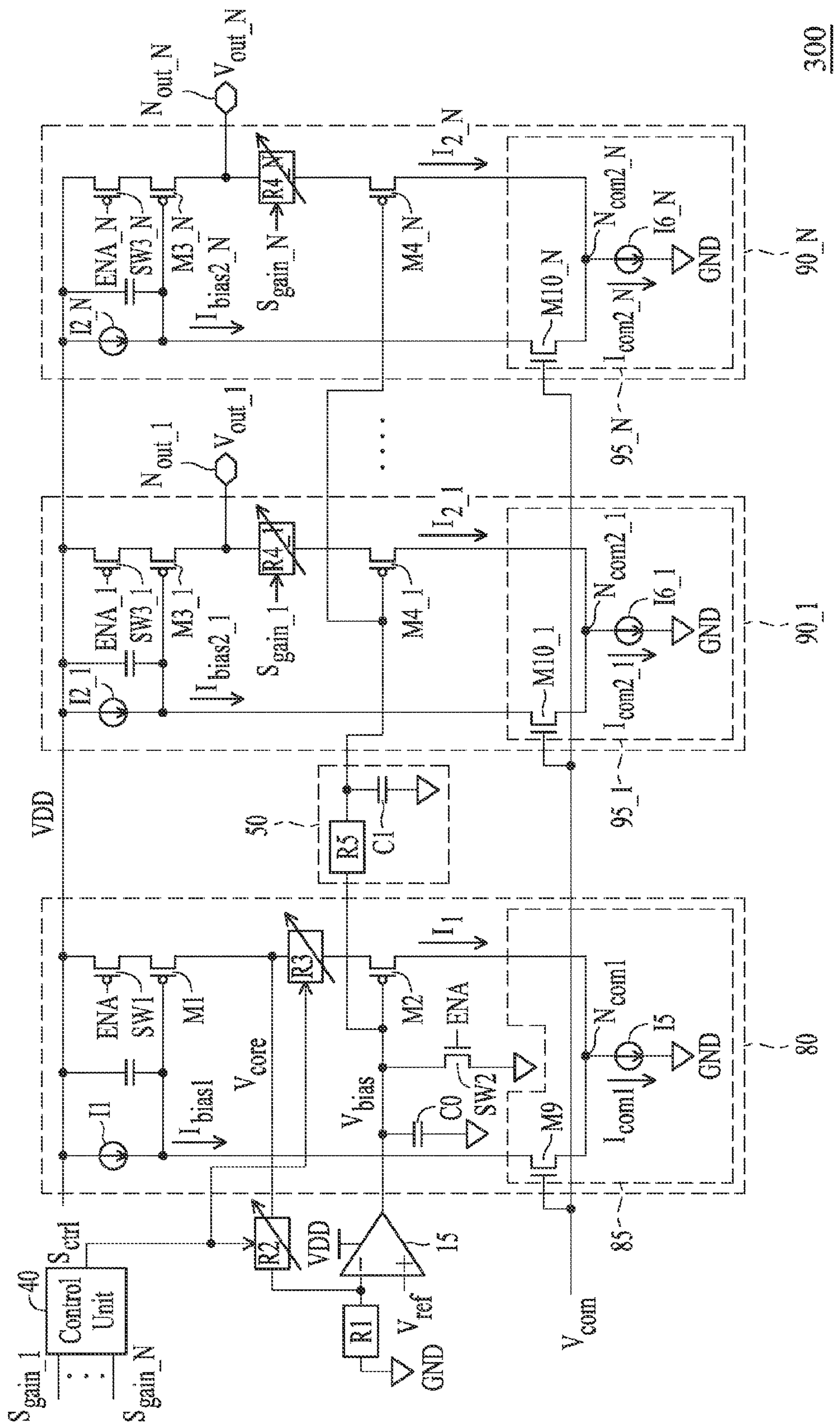
FIG. 5 shows a regulator according to another embodiment of the invention, wherein the regulator is a multi-output-level PMOS typed replica capless LDO voltage regulator.

FIG. 5 shows a regulator 300 according to another embodiment of the invention. The regulator 300 is a PMOS typed replica capless LDO voltage regulator, which provides the LDO voltages $V_{out\_1}$ to $V_{out\_N}$ in the output nodes $N_{out\_1}$ to $N_{out\_N}$, respectively. Compared to the basic unit 30 of the regulator 100 in FIG. 1, the transistors M1 and M2 of a basic unit 80 are the same type of MOS transistors (i.e. PMOS), and a current circuit 85 of the basic unit 80 is not a current mirror. In the basic unit 80, the current circuit 85 comprises a transistor M9 coupled between the current source I1 and a common node $N_{com1}$, and a current source 15 coupled between the common node $N_{com1}$ and the ground GND. Furthermore, the transistor M2 is coupled between the resistor R3 and the common node $N_{com1}$. Thus, the current source I5 drains a current $I_{com1}$ from the common node $N_{com1}$ to the ground GND, so that a current I1 flowing through the transistor M2 is determined according to the current $I_{com1}$ and the bias current $I_{bias1}$ (i.e. $I_{bias1}$+I1=$I_{com1}$) when the transistor M9 is controlled by a common voltage $V_{com}$. Compared to the replica units 20_1 to 20_N of the regulator 100 in FIG. 1, the transistors M3_1 to M3_N and M4_1 to M4_N of the replica units 90_1 to 90_N are the same type of MOS transistors (i.e. PMOS), and each of the current circuits 95_1 to 95_N is not a current mirror. The current circuits 95_1 to 95_N have the same circuits. Take the current circuit 95_1 as an example. In the current circuits 95, a current source I6_1 drains a current $I_{com2\_1}$ from a common node $N_{com2\_1}$ to the ground GND, so that a current $I_{2\_1}$ flowing through the transistor M4_1 is determined according to the current $I_{com2\_1}$ and the bias current $I_{bias2\_1}$ (i.e. $I_{bias2}+I2=I_{com2}$) when a transistor M10_1 is controlled by the common voltage $V_{com}$. In the regulator 300, global matching is needed to be considered between the transistor M2 and the transistors M4_1 to M4_N, between the current source I1 and the current sources I2_1 to I2_N and between the current source I5 and the current sources I6_1 to I6_N. Similarly, the output voltages $V_{out\_1}$ to $V_{out\_N}$ are determined according to the resistances of the resistors R4_1 to R4_N in the replica units 90_1 to 90_N due to the bias voltage $V_{bias}$, the gate-source voltages of the transistors M4_1 to M4_N and the currents I2_1 to I2_N being the same, wherein each resistance of the resistors R4_1 to R4_N in the replica units 90_1 to 90_N is controlled by an individual control signal (e.g. $S_{gain\_1}$ to $S_{gain\_N}$), thus the regulator 300 can provide the output voltages $V_{out\_1}$ to $V_{out\_N}$ with various voltage levels in the output nodes $N_{out\_1}$ to $N_{out\_N}$. Moreover, the sizes of the devices within the replica units 90_1 to 90_N should be equal or proportional to the sizes of the devices within the basic unit 80, such that each of the currents $I_{2\_1}$ to $I_{2\_N}$ matches the current $I_1$.

Figure 6:
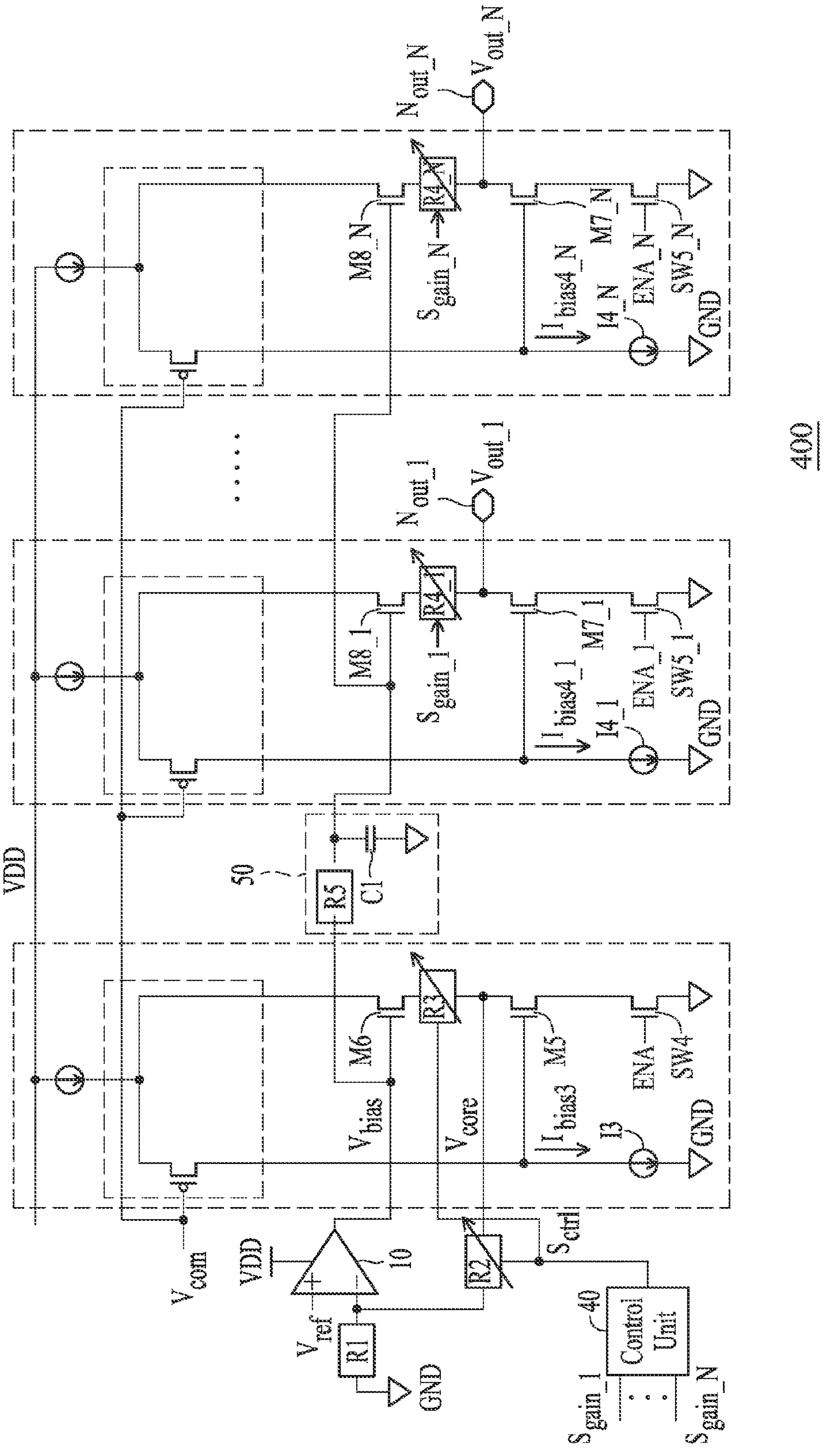
FIG. 6 shows a regulator according to another embodiment of the invention, wherein the regulator is a multi-output-level NMOS typed replica capless LDO voltage regulator.

FIG. 6 shows a regulator 400 according to another embodiment of the invention, wherein the regulator 400 is an NMOS typed replica capless LDO voltage regulator. Similarly, by using the control signals $S_{gain\_1}$ to $S_{gain\_N}$ to adjust the resistances of the resistors R4_1 to R4_N, the regulator 400 can provide the output voltages $V_{out\_1}$ to $V_{out\_N}$ with various voltage levels in the output nodes $N_{out\_1}$ to $N_{out\_N}$. Furthermore, for the regulator 300 of FIG. 5 and the regulator 400 of FIG. 6, the control unit 40 provides the control signal $S_{ctrl}$ to control the resistances of the resistors R2 and R3 according to the control signals $S_{gain\_1}$ to $S_{gain\_N}$, such that the core voltage $V_{core}$ is equal to or close to an average of the output voltage with a maximum voltage level and the output voltage with a minimum voltage level. Thus, a PSRR at a low frequency can be enhanced through the PSRR cancellation mechanism, as described above.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A regulator for providing a plurality of output voltages, comprising:

a basic unit, amplifying an input voltage to obtain a core voltage according to a first control signal; and a plurality of replica units, each outputting one of the output voltages according to the input voltage and one of a plurality of second control signals, wherein at least two of the output voltages have different voltage levels, wherein the first control signal is set according to the second control signals, to make the voltage level of the core voltage substantially equal to or less than a maximum voltage level of the output voltages and substantially equal to or greater than a minimum voltage level of the output voltages.

2. The regulator as claimed in claim 1, further comprising:

an amplifier having a non-inverting input terminal for receiving the input voltage, an inverting input terminal, and an output terminal;

a first resistor coupled between a ground and the inverting input terminal of the amplifier; and a second resistor having a first terminal coupled to the inverting input terminal of the amplifier and a second terminal, and having a first variable resistance controlled by the first control signal.

3. The regulator as claimed in claim 2, wherein each of the basic unit and the replica units comprises:

a first transistor having a first terminal coupled to a first voltage source, a gate and a second terminal;

a first current source coupled between the first voltage source and the gate of the first transistor, providing a bias current;

a third resistor having a first terminal coupled to the second terminal of the first transistor and a second terminal;

a second transistor, having a first terminal coupled to the second terminal of the third resistor, a gate coupled to the output terminal of the amplifier and a second terminal; and a current circuit coupled to a second voltage source, the first current source and the second terminal of the second transistor, draining a current flowing through the second transistor according to the bias current, wherein the third resistor of the basic unit has a resistance equal to the first variable resistance, and each of the third resistors of the replica units has a second variable resistance controlled by the individual second control signal, wherein the first terminal of the third resistor of the basic unit is coupled to the second terminal of the second resistor, and wherein each of the replica units outputs an individual output voltage at the first terminal of the third resistor thereof, and a voltage level of the individual output voltage is determined according to the input voltage and a ratio of the third resistor to the first resistor, and wherein the basic unit obtains the core voltage at the first terminal of the third resistor thereof.

4. The regulator as claimed in claim 3, wherein each of the second control signals has an integer value that indicates a gain level corresponding to the ratio of the third resistor of the individual replica unit to the first resistor, and the first control signal is set according to the second control signal having a maximum integer value and the second control signal having a minimum integer value.

5. The regulator as claimed in claim 4, wherein the first control signal has an integer value that indicates a gain level corresponding to the ratio of the third resistor of the basic unit to the first resistor, which is equal to or close to an average of the maximum integer value and the minimum integer value, such that the core voltage is equal to or close to an average of a maximum voltage level of the output voltages and a minimum voltage level of the output voltages.

6. The regulator as claimed in claim 5, wherein each of the first control signal and the second control signals is a logic signal using the same bit number to represent an integer value thereof, wherein the integer value of the first control signal is equal to an average of the maximum integer value and the minimum integer value when the sum of the maximum integer value and the minimum integer value is an even value, and the integer value of the first control signal is obtained by rounding up the average of the maximum integer value and the minimum integer value when the sum of the maximum integer value and the minimum integer value is an odd value.

7. The regulator as claimed in claim 3, wherein the first and second transistors are different types of MOS transistors, and the current circuit of each of the basic unit and the replica units comprises:

a first mirror transistor coupled between the second voltage source and the first current source; and a second mirror transistor coupled between the second voltage source and the second terminal of the second transistor, having a gate coupled to a gate of the first mirror transistor and the second terminal of the second transistor.

8. The regulator as claimed in claim 7, wherein the first transistor is an NMOS transistor and the second transistor is a PMOS transistor, and the first and second voltage sources are arranged to provide a supply voltage and a signal ground, respectively.

9. The regulator as claimed in claim 7, wherein the first transistor is a PMOS transistor and the second transistor is an NMOS transistor, and wherein the first and second voltage sources are arranged to provide a signal ground and a supply voltage, respectively.

10. The regulator as claimed in claim 3, wherein the first and second transistors are the same type of MOS transistors, and the current circuit of each of the basic unit and the replica units comprises:

a third transistor coupled between the first current source and the second terminal of the second transistor, having a gate for receiving a common voltage; and a second current source, coupled between the second terminal of the second PMOS transistor and the second voltage source.

11. The regulator as claimed in claim 10, wherein the first and second transistors are PMOS transistors, and the first and second voltage sources are arranged to provide a supply voltage and a signal ground, respectively.

12. The regulator as claimed in claim 10, wherein the first and second transistors are NMOS transistors, and wherein the first and second voltage sources are arranged to provide a signal ground and a supply voltage, respectively.

13. The regulator as claimed in claim 3, further comprising:

a filter coupled between the gate of the second transistor of the basic unit and the gates of the second transistors of the replica units, filtering noise from the output terminal of the amplifier.

14. The regulator as claimed in claim 3, wherein the basic unit further comprises:

a first switch coupled between the first voltage source and the first transistor; and a second switch coupled between the second voltage source and the output terminal of the amplifier, and each of the plurality of replica units further comprises:

a third switch coupled between the first voltage source and the first transistor, wherein the first and third switches are turned off and the second switch is turned on when the regulator is powered down, and the first switch is turned on and the second switch is turned off when one of the third switches is turned on.

15. A regulator for providing a plurality of output voltages, comprising:

a core circuit, providing a bias voltage according to a first control signal and an input signal and comprising a basic unit; and a plurality of replica units, each outputting one of the output voltages, wherein at least two of the output voltages have different voltage levels, wherein each of the basic unit and the replica units comprises:

a first transistor, having a gate for receiving the bias voltage, so that a reference current can flow through the first transistor; and a first resistor connected to the first transistor in series, having a resistance, wherein a voltage level of the output voltage is determined according to the reference current and the resistance of the first resistor in each of the replica units.

16. The regulator as claimed in claim 15, wherein the resistance of the first resistor in the basic unit is controlled by the first control signal, and the resistance of the first resistor in each of the replica units is controlled by one of a plurality of second control signals, wherein the first control signal is set according to the second control signals.

17. The regulator as claimed in claim 16, wherein the core circuit further comprises:

an amplifier having a non-inverting input terminal for receiving the input voltage, an inverting input terminal, and an output terminal for providing the bias voltage;

a second resistor coupled between a ground and the inverting input terminal of the amplifier; and a third resistor having a first terminal coupled to the inverting input terminal of the amplifier and a second terminal, and having a resistance equal to the resistance of the first resistor of the basic unit.

18. The regulator as claimed in claim 17, wherein each of the second control signals has an integer value that indicates a gain level corresponding to the ratio of the first resistor of the individual replica unit to the second resistor, and the first control signal is set according to the second control signal having a maximum integer value and the second control signal having a minimum integer value.

19. The regulator as claimed in claim 18, wherein the first control signal has an integer value that indicates a gain level corresponding to the ratio of the first resistor of the basic unit to the second resistor, which is equal to or close to an average of the maximum integer value and the minimum integer value.

20. The regulator as claimed in claim 19, wherein each of the first control signal and the second control signals is a logic signal using the same bit number to represent an integer value thereof, wherein the integer value of the first control signal is equal to an average of the maximum integer value and the minimum integer value when the sum of the maximum integer value and the minimum integer value is an even value, and the integer value of the first control signal is obtained by rounding the average of the maximum integer value and the minimum integer value up when the sum of the maximum integer value and the minimum integer value is an odd value.

21. The regulator as claimed in claim 17, wherein each of the replica units further comprises:

a second transistor coupled between a first voltage source and the first resistor, having a gate;

a first current source coupled between the first voltage source and the gate of the second transistor, providing a bias current; and a current circuit coupled to a second voltage source, the first current source and the first transistor, draining the reference current flowing through the first transistor according to the bias current.

22. The regulator as claimed in claim 21, wherein the first and second transistors are different type of MOS transistors, and the current circuit of each of the basic unit and the replica units comprises:

a first mirror transistor coupled between the second voltage source and the first current source; and a second mirror transistor coupled between the second voltage source and the first transistor, having a gate coupled to a gate of the first mirror transistor and the first transistor.

23. The regulator as claimed in claim 22, wherein the first transistor is a PMOS transistor and the second transistor is an NMOS transistor, and wherein the first and second voltage sources are arranged to provide a supply voltage and a signal ground, respectively.

24. The regulator as claimed in claim 22, wherein the first transistor is an NMOS transistor and the second transistor is a PMOS transistor, and wherein the first and second voltage sources are arranged to provide a signal ground and a supply voltage, respectively.

25. The regulator as claimed in claim 17, wherein the first and second transistors are the same type of MOS transistors, and the current circuit of each of the basic unit and the replica units comprises:

a third transistor, having a first terminal coupled to the first current source, a second terminal coupled to the first transistor, and a gate for receiving a common voltage; and a second current source, coupled between the second terminal of the third transistor and the second voltage source.

26. The regulator as claimed in claim 25, wherein the first and second transistors are PMOS transistors, and the first and second voltage sources are arranged to provide a supply voltage and a signal ground, respectively.

27. The regulator as claimed in claim 25, wherein the first and second transistors are NMOS transistors, and wherein the first and second voltage sources are arranged to provide a signal ground and a supply voltage, respectively.

28. The regulator as claimed in claim 17, further comprising:

a filter coupled between the gate of the second transistor of the basic unit and the gates of the first transistors of the replica units, filtering noise from the output terminal of the amplifier.

29. The regulator as claimed in claim 17, wherein the basic unit further comprises:

a first switch coupled between the first voltage source and the second transistor; and a second switch coupled between the second voltage source and the output terminal of the amplifier, and each of the plurality of replica units further comprises:

a third switch coupled between the first voltage source and the second transistor, wherein the first and third switches are turned off and the second switch is turned on when the regulator is powered down, and the first switch is turned on and the second switch is turned off when one of the third switches is turned on.

* * * * *